United States Patent [19]

Treirat

[11] 3,747,399
[45] July 24, 1973

[54] MOISTURE RESPONSIVE DEVICE

[76] Inventor: Eduard Treirat, 576 Broughton Ave., Bloomfield, N.J. 07003

[22] Filed: Aug. 17, 1971

[21] Appl. No.: 172,408

[52] U.S. Cl. ............................ 73/73, 61/13, 239/63, 47/38.1
[51] Int. Cl. .......................................... G01n 25/56
[58] Field of Search .................... 239/63, 68; 61/12, 61/13; 137/78; 73/73; 47/38.1

[56] References Cited
UNITED STATES PATENTS

| | | | |
|---|---|---|---|
| 3,091,115 | 5/1963 | Roberts | 73/73 |
| 2,445,717 | 7/1948 | Richards | 61/13 X |
| 3,642,204 | 2/1972 | McCloskey | 239/63 |
| 2,674,490 | 4/1954 | Richards | 61/13 |
| 2,863,698 | 12/1958 | Richards | 239/63 |
| 3,101,570 | 3/1963 | Lienard | 61/13 |
| 3,244,372 | 4/1966 | Hanner | 137/78 |

*Primary Examiner*—Charles J. Myhre
*Assistant Examiner*—R. H. Lazarus
*Attorney*—Gerald Durstewitz

[57] ABSTRACT

A device responsive to the presence of moisture in soil for controlling the flow of irrigating water to the soil being monitored. The device comprises a cylindrical body of capillary material of controlled porosity having one end surface exposed to the moisture in the soil through a wick. The body is provided with capillary passageways connecting the ends of the body. Moisture is drawn from the wick along these passageways by capillary action displacing air which moves toward the other end of the body. A casing sealed to the body and containing a diaphragm provides an enclosed volume into which displaced air is compressed. The displaced air generates a pressure within the enclosed volume which moves the diaphragm to operate a valve shutting off the irrigating water.

10 Claims, 2 Drawing Figures

3,747,399

MOISTURE RESPONSIVE DEVICE

BACKGROUND OF THE INVENTION

The present invention relates to moisture sensitive devices, and, more particularly, to such devices which generate a gaseous pressure in response to the presence of moisture.

It is well known in the field of agriculture, that satisfactory plant growth is achieved when the soil is subjected to a wetting and drying cycle which permits proper aeration of the soil. To achieve a maximum rate of plant growth, the degree to which the soil is wetted and the degree to which it dries out should be closely controlled. If the soil is of the type which readily holds water, and an overabundance of water is added to the soil during the wetting portion of the cycle, the plant roots are subject to an overly wet condition for too long a time and there is a danger of the roots rotting. On the other hand, if the soil dries out too much between wettings, the plants will wilt. Both over-watering and over-drying of the soil can both interfere with the growth of the plant and cause damage to the plant so that furture growth is adversely effected.

It has been proposed in U.S. Pat. No. 2,445,717 to regulate the watering of plants by utilizing a porous ceramic body buried in the soil at the bottom of a sealed vertical tube filled with water. A vacuum sensitive diaphragm is provided in the tube and operates a valve which controls the irrigation system. When the soil surrounding the ceramic body dries out, the water in the tube seeps through the pores of the ceramic body into the soil. As water flows from the tube, the air pressure in the sealed tube drops below atmospheric and draws in the diaphragm turning on a water valve. The irrigating water is absorbed by the soil and when the soil surrounding the ceramic body is saturated the flow of water through the ceramic reverses and the pressure in the tube approaches atmospheric. The diaphragm then moves outwardly and the water valve closes terminating the watering.

In the prior art system, as disclosed in lines 11 through 28 of column 5 of the patent, the water in the tube is gradually replaced by air and it is necessary to periodically replenish the water in the tube. For this reason, it is necessary that the tube extend about the surface of the ground and be provided with a cap for adding the water. The extension of the tube above the ground interferes with the cultivation of the soil and requires that the tube be of sufficient length to extend from the roots of the plants to the surface of the ground.

SUMMARY OF THE INVENTION

It is an object of the present invention to provide a novel moisture responsive device.

Another object is to provide such a device which generates a gas pressure when exposed to moisture.

Another object is to provide such a device which does not require periodic servicing.

Another object is to provide such a device for controlling the watering of plants and which can be completely buried.

Another object is to provide such a device in which the gaseous pressure generated produces mechanical motion.

Another object is to provide such a device which operates a valve controlling the watering of the soil.

The foregoing objects are accomplished by providing a device responsive to the presence of moisture comprising a body of capillary material of controlled porosity, the first surface portion being in contact with the medium to be monitored, means providing an enclosed volume in communication with the second surface portion, the body of capillary material having normally gas filled capillary passageways extending between two surface portions whereby moisture in the medium is drawn by capillary action along the passageways and displaces the gaseous medium therein into the enclosed volume to increase the pressure in the volume.

BRIEF DESCRIPTION OF THE DRAWINGS

A preferred embodiment of the invention has been chosen for the purposes of illustration and description, and is shown in the accompanying drawings, forming a part of the specification, wherein.

DESCRIPTION OF THE PREFERRED EMBODIMENT

Figure 1:
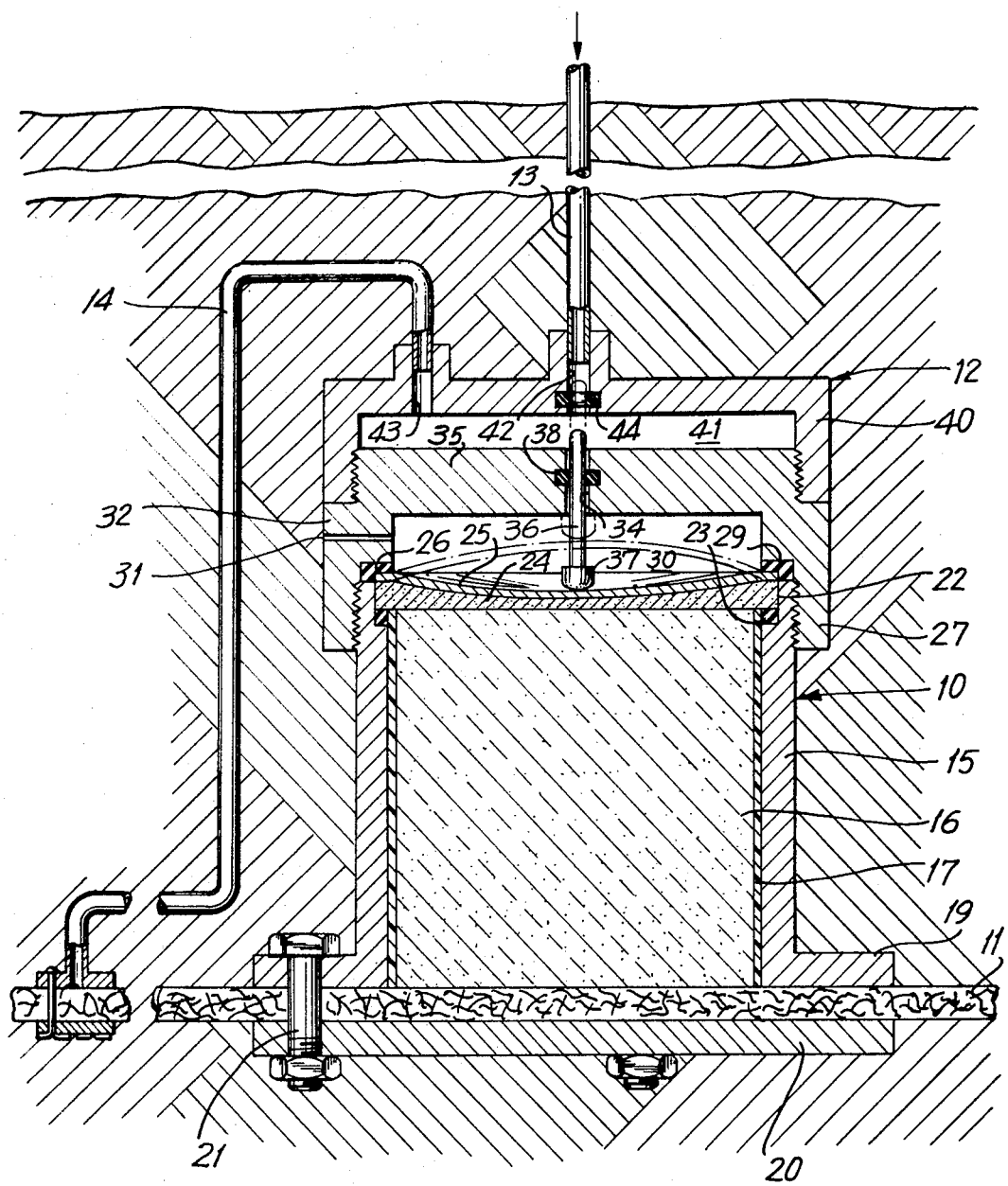
FIG. 1 is an elevational view, in section, showing a moisture responsive device according to the present invention positioned in soil and connected to a water supply for irrigating the soil.

Referring to FIG. 1 of the drawings, there is shown a moisture responsive device 10 buried in soil, a sheet 11 of wicking material also buried in the soil against which the moisture sensing surface of the device 10 is held in contact a valve 12 mounted on the device 10 to be controlled thereby, a tube 13 connecting the inlet of the valve 12 to a source of water (not shown), and a tube 14 connecting the outlet of the valve 12 to the sheet 11 of wicking material.

The device 10 includes a tubular casing 15 in which is positioned a mass of capillary material 16 having a controlled porosity. An annular sealing member 17 is positioned between the casing 15 and the material 16. The lower end of the casing 15 is provided with an annular flange 19 and the wick material 11 is clamped between the flange and a plate 20 by bolts 21 so as to be in contact with the lower surface of the mass of material 16. The upper end of the casing 15 is provided with an internal annular recess 22 in which is positioned an annular compressible plastic gasket 23 and a porous disc 24 having a concave upper surface. A spring metal "oil canning" diaphragm 25, overlies the disc 24. An annular plastic gasket 26 surrounds and extends over the outer edge of the disphragm 25. A circular cap 27 is threaded onto the upper end of the casing 15 and is provided with a shoulder 29 which engages and squeezes the gasket 26 providing a pressure seal to prevent air flow around the edge of the diaphragm. The cap 27 defines, with the diaphragm 25, a chamber 30 and the cap is provided with a vent hole 31 in its side wall 32 and a bore 34 in its top wall 35. A pin 36 extends from the chamber 30 through the bore 34 and is formed with a head 37 at its lower end in contact with the diaphragm 25. An "O" ring seal 38 is positioned in the top wall 35 at the bore 34 to provide a liquid seal between the wall 35 and the pin 36.

The mass of material 16 is composed of spherical glass beads having diameters ranging from 0.0029 to 0.0017 inches. In assembling the device, the body 15 and the plate 20 are clamped to the wick material, the gasket 23 and the sealing member 17 are put in place, and the beads are poured into the body. The body is tapped or shaken to settle the beads, the disc 24 and the diaphragm 25 are put in place, and the cap 27 (carrying the gasket 26 and the pin 36) is screwed down onto the body to force the beads into close contact. The air spaces between the beads are extremely small (being of the order of 0.001 inch radius) and provide a plurality of interconnected capillary passageways extending between the surface of the mass 16 in contact with the wick material and the surface in contact with the porous disc 24. The annular sealing member 17 may be a sleeve of rubber or other soft plastic material or a coating of epoxy resin or the like. The beads around the outer periphery of the mass 16 are partially embedded in the sealing member 17 to minimize the size of the open spaces in this area. This may be accomplished, in the case of a deformable sleeve, by placing a compressive force on the beads by threading down the cap 27, or, in the case of a material like epoxy resin, the beads are introduced into the body 15 while the material is still in a semi-fluid state.

The valve 12 includes a cup shaped cap 40 threaded onto the top of the cap 27 to provide a chamber 41. The cap 40 is formed with an inlet passageway 42 receiving the tube 13 and an outlet passageway 43 receiving the tube 14. An "O" ring 44 in the passageway 42 provides a valve seal which is engaged by the stem 36 to control the flow of water from the tube 13 to the tube 14. In operation, the valve 12 is normally open and water flows from the tube 13 into the chamber 41 and through the tube 14 to the wick material 11. The water in the wick material is drawn, by capillary action, into the passageways formed by the spaces between the beads of the mass of material 16. The movement of the water along these passageways displaces the air in the passageways. The displaced air cannot flow past the diaphragm 25 and, as the water progressively moves toward the diaphragm, the air is forced into a progressively smaller volume and is compressed. When the air pressure reaches a predetermined valve the oil canning diaphragm operates and snaps up to the position shown in the dotted lines. The stem 36 is then thrust into the passageway 42 and engages the "O" ring 44 to shut off the water flow to the wick 11.

The diaphragm 25 maintains this position until the soil and the wick 11 dries and draws sufficient water from the capillary passageways in the material 16 to relieve the air pressure on the diaphragm. The diaphragm then snaps down to its original position allowing water to once again flow to the wick 11.

The soil is thereby passed through repeated cycles of wetting and drying to provide conditions for maximum plant growth.

The operation of this device is dependent upon the capillary material 16 having a closely controlled porosity. The air pressure which can be generated by water being drawn by capillary action along a capillary tube is inversely proportional to the radius of the tube. The pressure with which water is drawn up a capillary tube is given by the formula $P = 2 St/r$; where $P$ is pressure in pounds per square inch (P.S1), $St$ is the surface tension of the liquid in pounds per inch, and $r$ is the radius of the capillary tube in inches.

The motion of the water up a closed end capillary tube stops when the air pressure acting on the upper surface of the water column equals the pressure given by the formula. Thus, if a capillary tube having a constant radius of 0.0005 inch is sealed at the top end, water will rise in the tube until the air therein has been compressed to 1.65 PS1, a value equal to that given by the formula under these conditions.

If, however, the capillary tube is not of uniform cross-section, the pressure developed tends to be controlled by the radius of the widest portion of the tube. In a closed end tube having a 0.0005 inch radius throughout the majority of its length and having portions which widen out to 0.005 inch, the movement of the water would be halted at the first wide portion if the air pressure in the tube then equaled or exceeded 0.165 PS1. If at that time the air pressure was less than this value, the water would be drawn past this wide point. If the next wide point was spaced at a sufficient distance along the tube, the pressure in the tube could reach 1.65 PS1. However, if the wide portions were closely spaced the final pressure developed would be about the 0.165 PS1 value. Should the air pressure reach a value considerably above 0.165 PS1 as the water is drawn from one wide section to a second, the water will stop short of the widest part of the second section at a point of intermediate radius, where the air pressure is balanced by the pressure acting on the water.

Where, as in this invention, there are a plurality of capillary tubes which lead into a common chamber (rather than being individually sealed off) the pressure generated in the chamber will be limited by the effect of the capillary tubes generating the least pressure. It is extremely important, therefore, that the mass of capillary material have a closely controlled porosity.

Figure 2:
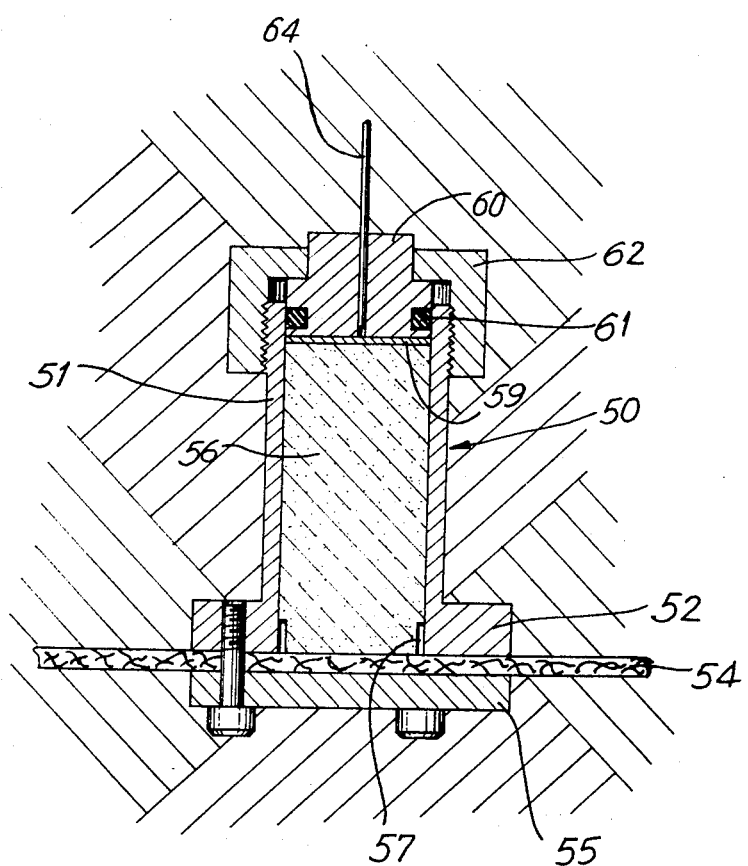
FIG. 2 is a longitudinal sectional view of a moisture responsive device according to the present invention which is connected to a capillary size tube for connection to a pressure sensitive device.

Referring now to FIG. 2, there is shwon a moisture responsive device 50 according to the present invention modified for connection to recording, indicating, or measuring apparatus. The device 50 includes a tubular casing 51 having a flange 52, and a sheet 54 of wick material is clamped between the flange 52 and a plate 55. The casing 51 is filled with a mass 56 of of capillary material having a controlled porosity. An annular band of of epoxy resin 57 provides a seal between the mass 56 and the inner surface of the casing 51. A porous 59 is positioned on top of the mass 56. A stepped plug 60 carrying an "O" ring seal 61 is held against the disc 59 by means of an annular nut 62 threaded onto the body 51. The plug 60 is provided with a central bore in which a capillary tube 64 is sealed. The tube 64 may be connected to apparatus suitable for indicating, measuring or recording the pressure or volume of the air displaced when the sheet 54 is wet by a liquid and the liquid moves along the capillary passageways in the material 56.

A specific embodiment constructed according to FIG. 2 was employed to measure the volume and pressure of the air displaced from a mass of controlled porosity material in response to the wetting of the wick material. In this specific embodiment the inside diameter of the body 51 was 1 inch, the length of the body was 2.5 inches, the mass was composed of glass beads having a range of diameters from 0.0029 to 0.0017 inches, the wick 54 was composed of polypropilene carpeting, and the wick was saturated with water.

In testing the air displacement of the unit, the capillary tube 64 was connected to a manometer, the wick 54 was saturated, and the volume of air displaced through the tube 64 was continuously measured. It was found that 5 minutes after saturation of the wick, 0.010 cubic inches of air had been displaced, and after 15 minutes 0.032 cubic inches of air had been displaced.

In another test, the capillary tube was connected to a pressure measuring instrument. The volume of the capillary tube and the interior of the measuring instrument was approximately 0.005 cubic inches. The wick was saturated and the following pressure readings were achieved at the stated intervals from the time of saturation of the wick: 5 minutes - 0.200 pounds per square inch; 30 minutes - 0.392 pounds per square inch; 1 hr. 36 minutes - 0.443 pounds per square inch. While these air displacement and pressure valves are small, they are sufficient to operate an actuating device such as a diaphragm for controlling a valve. If desired, higher pressures can be achieved by reducing the cross sectional dimensions of the capillary passageways (for example by using smaller glass beads) and greater air displacement can be achieved by using a mass 56 of greater volume.

While the subject invention has been described herein in connection with plant irrigation, it is to be understood it can be used for other purposes to control liquid flow to an absorbing medium or to monitor the liquid content of such a medium.

It will be seen from the foregoing that the present invention provides a novel moisture responsive device which generates a gaseous pressure when exposed to moisture, can be completely buried in a liquid absorbing medium to control the flow of liquid to that medium, and does not require periodic servicing.

I claim:

1. A device for generating a positive gaseous pressure in response to the presence of moisture in a medium comprising a body of controlled porosity capillary material having a first surface portion to be placed in contact with the medium and a second surface portion spaced from said first surface portion, said body having uniformly minute capillary passageways filled with gaseous medium of atmospheric pressure when the medium is dry, said capillary passageways effectively connecting only said first and second surface portions whereby moisture in the medium is drawn by capillary action along said passageways and displaces the gaseous medium therein toward said second surface, and means sealed to said body providing an enclosed volume in communication with said second surface for confining the displaced gaseous medium to an extent such that a pressure is produced in said volume which is detectably above atmospheric when moisture is present in the medium.

2. A device according to claim 1 wherein said body contains multi-directional capillary passageways and includes a sealed third surface portion defining a peripherial band between said first and second surface portions to provide effective connection only between said first and second surface portions.

3. A device according to claim 1 wherein the maximum effective radius of each of said passageways is about 0.001 inches.

4. A device according to claim 2 wherein said means providing said enclosed volume is in sealing relationship with said third surface portion.

5. A device according to claim 2 including pressure responsive means in said volume for converting changes in pressure into mechanical motion.

6. A device according to claim 5 including a porous member between said second surface and said pressure responsive means.

7. A device according to claim 1 including a casing member surrounding said body between the first and second surface portions thereof, a cap member carried by said casing member providing the enclosed volume, and a pressure responsive member positioned in said volume between said second surface and said cap member to be moved by gaseous medium displaced from said body of controlled porosity material.

8. A device according to claim 7 wherein said body contains multi-directional capillary passageways and means are included providing a peripherial seal between the inner surface of said casing member and the outer surface of said body between said first and second surface portions thereof.

9. A device according to claim 1 including pressure responsive means in said volume for converting changes in pressure into mechanical motion.

10. A device according to claim 1 wherein said enclosed volume has a gas capacity which is less than the total volume of said body.

* * * * *